(12) United States Patent
Chuang

(10) Patent No.: US 11,893,141 B2
(45) Date of Patent: Feb. 6, 2024

(54) METHOD AND CONTROL CIRCUIT FOR MANAGING INFORMATION OF ELECTRONIC DEVICE

(71) Applicant: PUFsecurity Corporation, Hsinchu County (TW)

(72) Inventor: Kai-Hsin Chuang, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 284 days.

(21) Appl. No.: 17/542,530

(22) Filed: Dec. 6, 2021

(65) Prior Publication Data

US 2022/0261508 A1  Aug. 18, 2022

Related U.S. Application Data

(60) Provisional application No. 63/151,020, filed on Feb. 18, 2021.

(51) Int. Cl.

| | |
|---|---|
| *G06F 21/72* | (2013.01) |
| *H04L 9/32* | (2006.01) |
| *H04L 9/08* | (2006.01) |
| *G06F 21/60* | (2013.01) |
| *H04L 9/40* | (2022.01) |
| *H04L 9/00* | (2022.01) |

(52) U.S. Cl.
CPC ............ *G06F 21/72* (2013.01); *G06F 21/606* (2013.01); *H04L 9/0825* (2013.01); *H04L 9/0869* (2013.01); *H04L 9/0891* (2013.01); *H04L 9/3247* (2013.01); *H04L 9/3271* (2013.01); *H04L 63/061* (2013.01); *H04L 9/3278* (2013.01); *H04L 9/50* (2022.05)

(58) Field of Classification Search
CPC ..... G06F 21/72; G06F 21/606; H04L 9/0825; H04L 9/0869; H04L 9/0891; H04L 9/3271; H04L 63/061
See application file for complete search history.

(56) References Cited

U.S. PATENT DOCUMENTS

| | | |
|---|---|---|
| 8,848,905 B1 | 9/2014 | Hamlet |
| 9,832,026 B2 | 11/2017 | Kravitz |
| 10,657,261 B2 | 5/2020 | Kumar |

(Continued)

FOREIGN PATENT DOCUMENTS

| | | |
|---|---|---|
| CN | 110336663 A | 10/2019 |
| CN | 111342963 A | 6/2020 |
| TW | 202038123 A | 10/2020 |

*Primary Examiner* — Shanto Abedin
(74) *Attorney, Agent, or Firm* — Winston Hsu

(57) ABSTRACT

A method and a control circuit for managing information of an electronic device are provided, where the electronic device includes the control chip. The method includes: utilizing a static entropy source of the control circuit to provide static entropy data; utilizing a cryptographic circuit of the control circuit to generate a public key and a private key according to the static entropy data, where the public key is to be registered into a blockchain by an identifier (ID) management device; and utilizing a signature generating circuit to generate a digital signature at least according to the private key, where the information of the electronic device is to be uploaded to the blockchain in conjunction with the digital signature.

18 Claims, 11 Drawing Sheets

(56) References Cited

U.S. PATENT DOCUMENTS

| | | | |
|---|---|---|---|
| 2018/0343126 A1* | 11/2018 | Fallah | H04L 9/3297 |
| 2019/0166116 A1* | 5/2019 | Kumar | H04L 9/3268 |
| 2020/0403789 A1* | 12/2020 | Murdoch | H04L 9/0662 |
| 2020/0412521 A1 | 12/2020 | Shi | |
| 2021/0176075 A1* | 6/2021 | Chu | H04L 9/3247 |

* cited by examiner ion No. 63/151,020, which was filed on Feb. 18, 2021, and is included herein by reference.
METHOD AND CONTROL CIRCUIT FOR MANAGING INFORMATION OF ELECTRONIC DEVICE

CROSS REFERENCE TO RELATED APPLICATIONS

This application claims the benefit of U.S. provisional application No. 63/151,020, which was filed on Feb. 18, 2021, and is included herein by reference.

BACKGROUND OF THE INVENTION

1. Field of the Invention

The present invention is related to information management, and more particularly, to a method and a control circuit for managing information of an electronic device.

2. Description of the Prior Art

For an electronic product, it is typically required to record processing history of the electronic product for better management during its product lifecycle. The processing history may be stored in a shared database for multiple electronic products. As a result, proper managing mechanism of information of these electronic products is required. For example, when information of a certain electronic product is uploaded into the shared database, it is hard to confirm whether the uploaded information indeed corresponds to this electronic product. Thus, there is a need for a novel method and an associated control circuit, which can prevent information of an electronic product stored in the shared database from being maliciously tampered or erroneously recorded.

SUMMARY OF THE INVENTION

An objective of the present invention is to provide a method and a control circuit for managing information of an electronic device, which can make information of a specific electronic product recorded in the shared database be able to be verified, for example, for determining whether the information is indeed from the specific electronic product or whether the information is confirmed by the specific electronic product.

At least one embodiment of the present invention provides a method for managing information of an electronic device. The method comprises: utilizing a static entropy source to provide static entropy data; utilizing a cryptographic circuit to generate a public key and a private key according to the static entropy data, where the public key is to be registered into a blockchain by an identifier (ID) management device; and utilizing a signature generating circuit to generate a digital signature at least according to the private key, where the information of the electronic device is to be uploaded to the blockchain in conjunction with the digital signature.

At least one embodiment of the present invention provides a control circuit for managing information of an electronic device, where the electronic device comprises the control circuit, and the control circuit comprises a static entropy source, a cryptographic circuit and a signature generating circuit. The static entropy source is configured to provide static entropy data. The cryptographic circuit is configured to generate a public key and a private key according to the static entropy data. The signature generating circuit is configured to generate a digital signature at least according to the private key. More particularly, the public key of the control circuit is to be registered into a blockchain by an identifier (ID) management device, and the information of the electronic device is uploaded to the blockchain in conjunction with the digital signature.

The method and the control circuit provided by the embodiments of the present invention can take the public key as an unique ID of the electronic device, and this unique ID can be registered in the blockchain which is hard to be tampered. In addition, as the information being uploaded to the blockchain is followed by the digital signature which is generated according to the private key, the digital signature can be utilize for verifying whether the information is from the electronic device corresponding to the unique ID.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
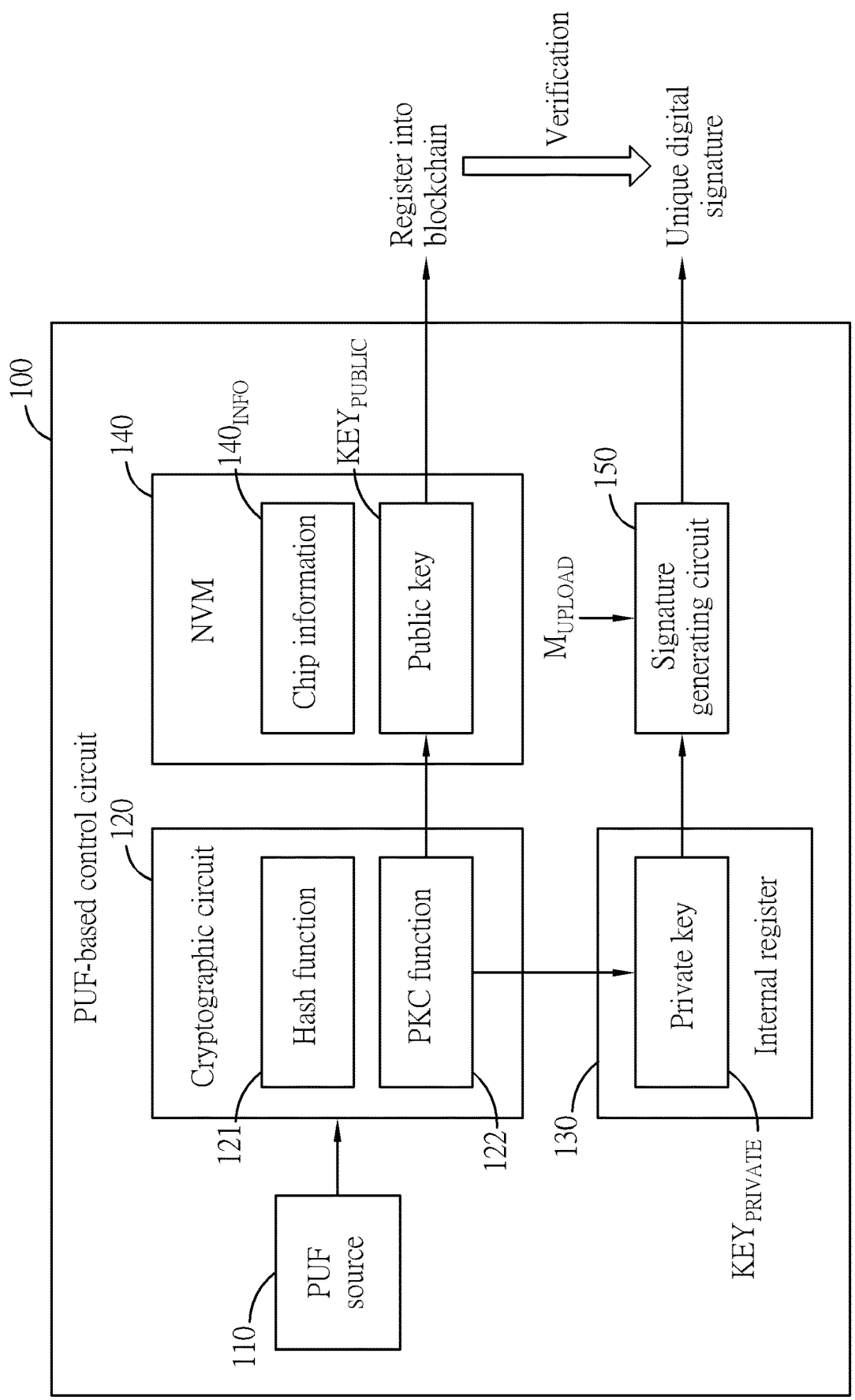
FIG. 1 is a diagram illustrating a control circuit according to an embodiment of the present invention.

FIG. 1 is a diagram illustrating a control circuit such as a Physical Unclonable Function (PUF)-based control circuit 100 according to an embodiment of the present invention, where the PUF-based control circuit 100 may be included in an electronic device and is configured to manage information of the electronic device. As shown in FIG. 1, the PUF-based control circuit 100 may comprise a static entropy source such as a PUF source 110, a cryptographic circuit 120, an internal register 130, a non-volatile memory (NVM) 140 and a signature generating circuit 150. The PUF source 110 may be configured to provide static entropy data. For example, the PUF source 110 may comprise a PUF array which may be regarded as an on-chip fingerprint. As physical characteristics of different chips may be slightly different from each other due to some uncontrollable factors in the manufacturing process, these differences are unable to be copied or predicted. In addition, as these physical characteristics would be determined and unchangeable after the chip has been manufactured, the PUF array may be configured to provide the static entropy data.

In this embodiment, the cryptographic circuit 120 may be configured to generate a public key $KEY_{PUBLIC}$ and a private key $KEY_{PRIVATE}$ according to the static entropy data. For example, the cryptographic circuit 120 may perform a hash function 121 and an asymmetric cryptography algorithm such as a public-key cryptography (PKC) function 122 to generate the public key $KEY_{PUBLIC}$ and the private key $KEY_{PRIVATE}$ according to the static entropy data. The internal register 130 may be configured to store the private key $KEY_{PRIVATE}$, where the internal register is unreadable for outside of the PUF-based control circuit 100 or the electronic device. The NVM 140 may be configured to store chip information $140_{INFO}$ (which may comprise a serial number, a version number of firmware, etc.) and the public key $KEY_{PUBLIC}$. The signature generating circuit 150 may be configured to generate a digital signature at least according to the private key $KEY_{PRIVATE}$. In particular, the public key $KEY_{PUBLIC}$ of the PUF-based control circuit 100 may be registered into a blockchain, and when information (which recording processing history of the electronic device) is uploaded to the blockchain, the information of the electronic device may be uploaded in conjunction with the digital signature to the blockchain. For example, when an event message $M_{UPLOAD}$ of the electronic device needs to be uploaded to the blockchain, the signature generating circuit 150 may generate the digital signature according to the private key $KEY_{PRIVATE}$ and the event message $M_{UPLOAD}$. It should be noted that as the public key $KEY_{PUBLIC}$ and the private key $KEY_{PRIVATE}$ is generated according to the static entropy data (which is unique for the PUF-based control circuit 100), the public key $KEY_{PUBLIC}$ may be regarded as an unique identifier (ID) of the electronic device, and the digital signature generated according to the private key $KEY_{PRIVATE}$ may be regarded as an unique digital signature of the electronic device.

In this embodiment, according to the digital signature, a certain device is configured to perform verification of a relationship between the information (e.g., the event message $M_{UPLOAD}$) of the electronic device and the public key $KEY_{PUBLIC}$ (e.g., the unique ID of the electronic device) registered in the blockchain. For example, a verifier device may generate a verification result according to the public key $KEY_{PUBLIC}$ and a digital signature, where assuming that this digital signature is generated by a certain private key, if this digital signature is from the PUF-based control circuit 100, which means this private key is $KEY_{PRIVATE}$ and belongs to a same pair of keys with the public key $KEY_{PUBLIC}$, the verification result may indicate that this digital signature pass the verification, and a message being uploaded in conjunction with this digital signature may be confirmed to be from the electronic device (e.g., the PUF-based control circuit 100 therein); and if this signature is from another electronic device instead of the PUF-based control circuit 100, which means this private key does not belong to the same pair of keys with the public key $KEY_{PUBLIC}$, the verification result may indicate that this digital signature fails to pass the verification, and a message being uploaded in conjunction with this digital signature may be determined as from other electronic device, rather than the electronic device comprising the PUF-based control circuit 100.

Figure 2:
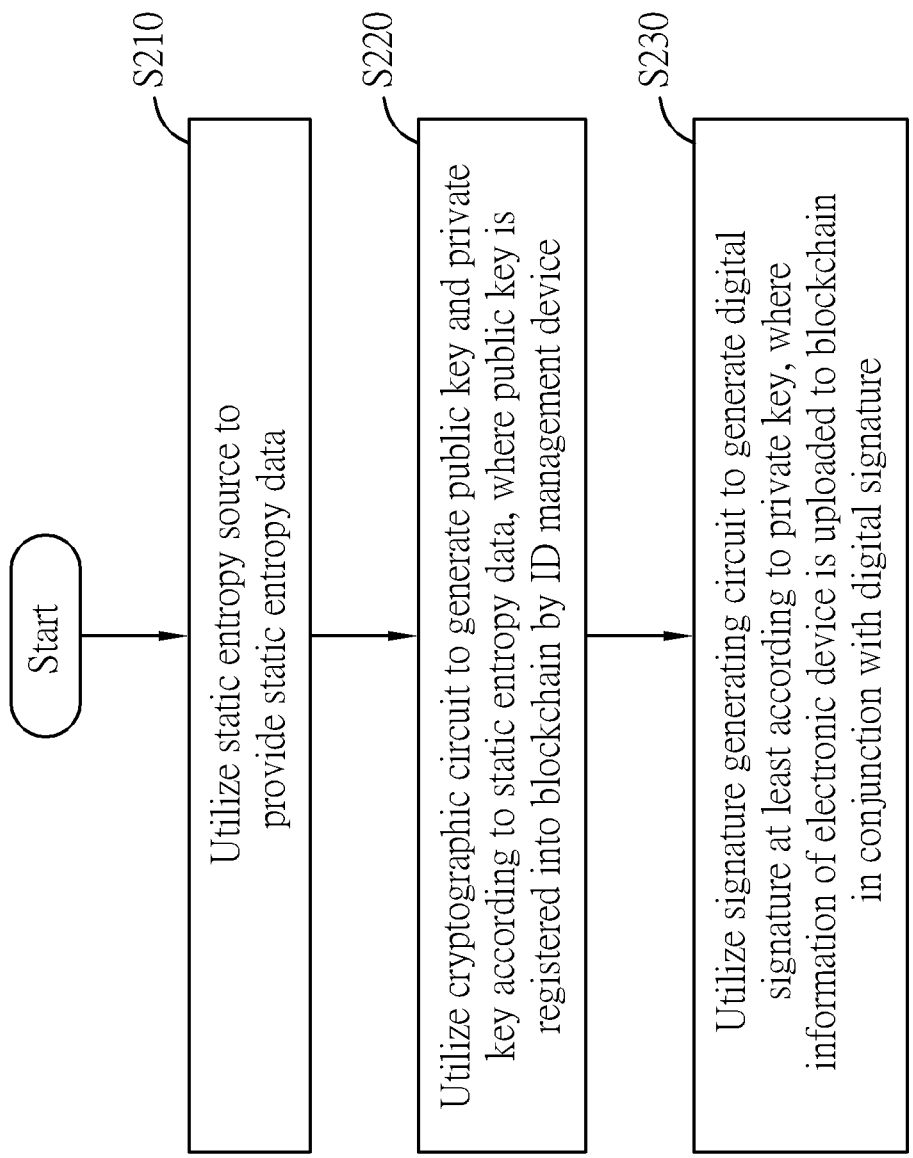
FIG. 2 is a diagram illustrating a working flow of a method for managing information of an electronic device according to an embodiment of the present invention.

FIG. 2 is a diagram illustrating a working flow of a method for managing information of an electronic device according to an embodiment of the present invention, where the method is applicable to a control circuit (e.g., the PUF-based control circuit 100 shown in FIG. 1) of the electronic device. It should be noted that one or more steps may be added, deleted or modified in the working flow shown in FIG. 2, and these steps do not have to be executed in the exact order shown in FIG. 2 if an overall result is not hindered.

In Step S210, the control circuit may utilize a static entropy source thereof (e.g., the PUF source 110 shown in FIG. 1) to provide static entropy data.

In Step S220, the control circuit may utilize a cryptographic circuit thereof (e.g., the cryptographic circuit 120 shown in FIG. 1) to generate a public key (e.g., the public key $KEY_{PUBLIC}$ shown in FIG. 1) and a private key (e.g., the private key $KEY_{PRIVATE}$ shown in FIG. 1) according to the static entropy data, where the public key is registered into a blockchain by an identifier (ID) management device.

In Step S230, the control circuit may utilize a signature generating circuit (e.g., the signature generating circuit 150 shown in FIG. 1) to generate a digital signature at least according to the private key, where the information (e.g., the event message $M_{UPLOAD}$ shown in FIG. 1) of the electronic device is uploaded to the blockchain in conjunction with the digital signature.

Figure 3:
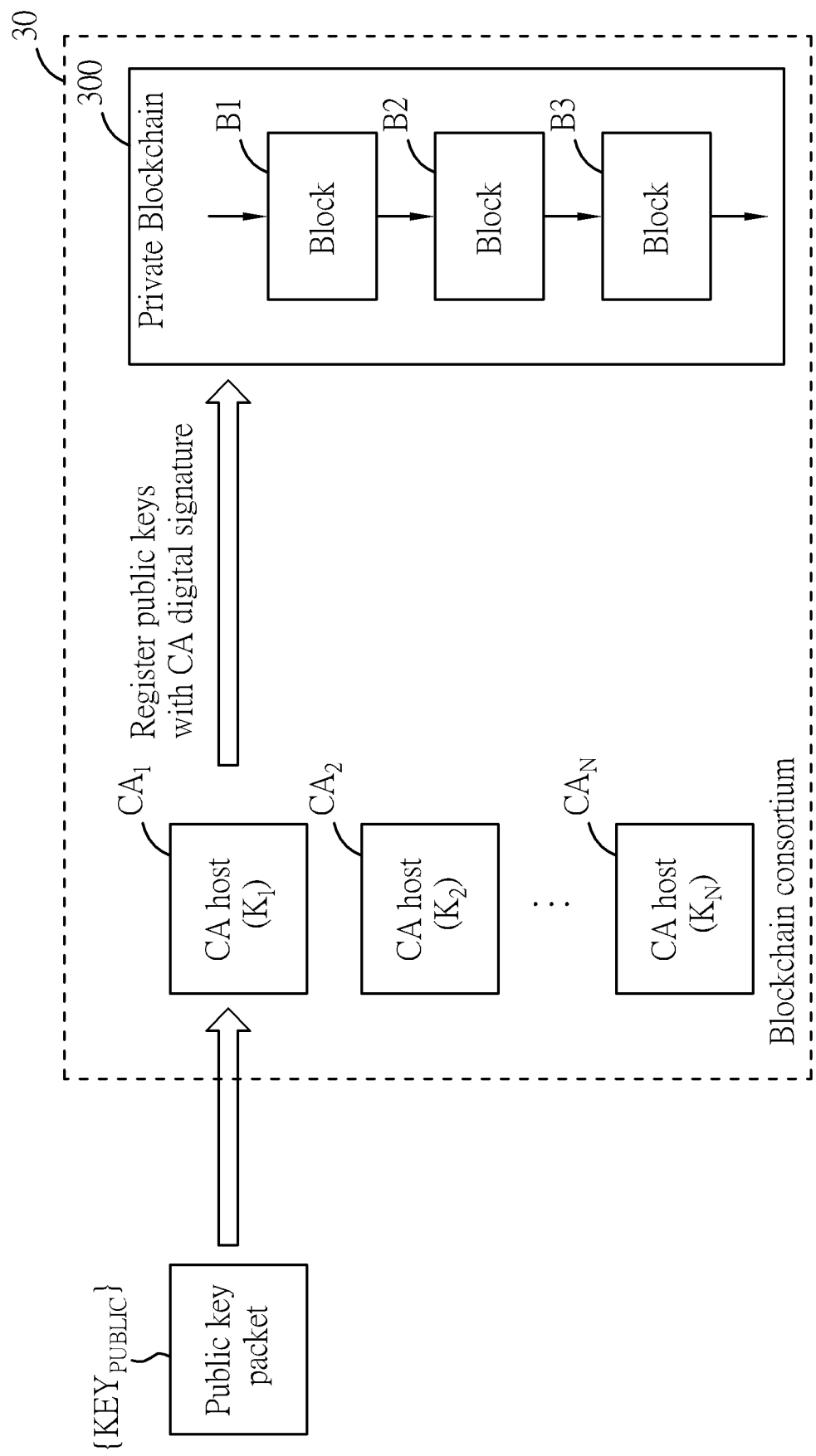
FIG. 3 is a diagram illustrating a public key packet being registered into a private digital database according to an embodiment of the present invention.

FIG. 3 is a diagram illustrating a public key packet $\{KEY_{PUBLIC}\}$ (which comprises pubic keys respectively received from multiple electronic devices) being registered into a digital database such as a private blockchain 300 according to an embodiment of the present invention. Data recorded in the private block chain 300 may be illustrated by multiple blocks B1, B2 and B3 that are linked with aid of cryptography. For example, the block B2 may comprise a cryptographic hash function of the block B1, and the block B3 may comprise a cryptographic hash function of the block B2. Thus, data recorded in the private block chain 300 can be resistant to modification once the data is recorded. In this embodiment, there are N CAs in a blockchain consortium 30, and only the N CAs is capable of utilize the service of the private blockchain 300. For example, when a manufacturer needs to register respective public keys (e.g. the public key packet $\{KEY_{PUBLIC}\}$) of multiple electronic products thereof into the blockchain, the manufacturer needs to issue a registration request to any CA of the specific CAs, and the CA receiving the registration request may utilize a CA host thereof (e.g., any of the CA hosts $CA_1$, $CA_2$, ... and $CA_N$) to register these public keys into the blockchain. More particularly, each of the CA hosts $CA_1$, $CA_2$, ... and $CA_N$ may utilize a dedicated private key (e.g., private keys $K_1$, $K_2$, ... and $K_N$ respectively labeled in corresponding CA hosts $CA_1$, $CA_2$, ... and $CA_N$) thereof to generate a digital signature, and the public key packet $\{KEY_{PUBLIC}\}$ to be registered may be uploaded in conjunction with this digital signature to the block chain 300 (labeled "Register public keys with CA digital signature" in FIG. 3 for better comprehension), but the present invention is not limited thereto.

Figure 4:
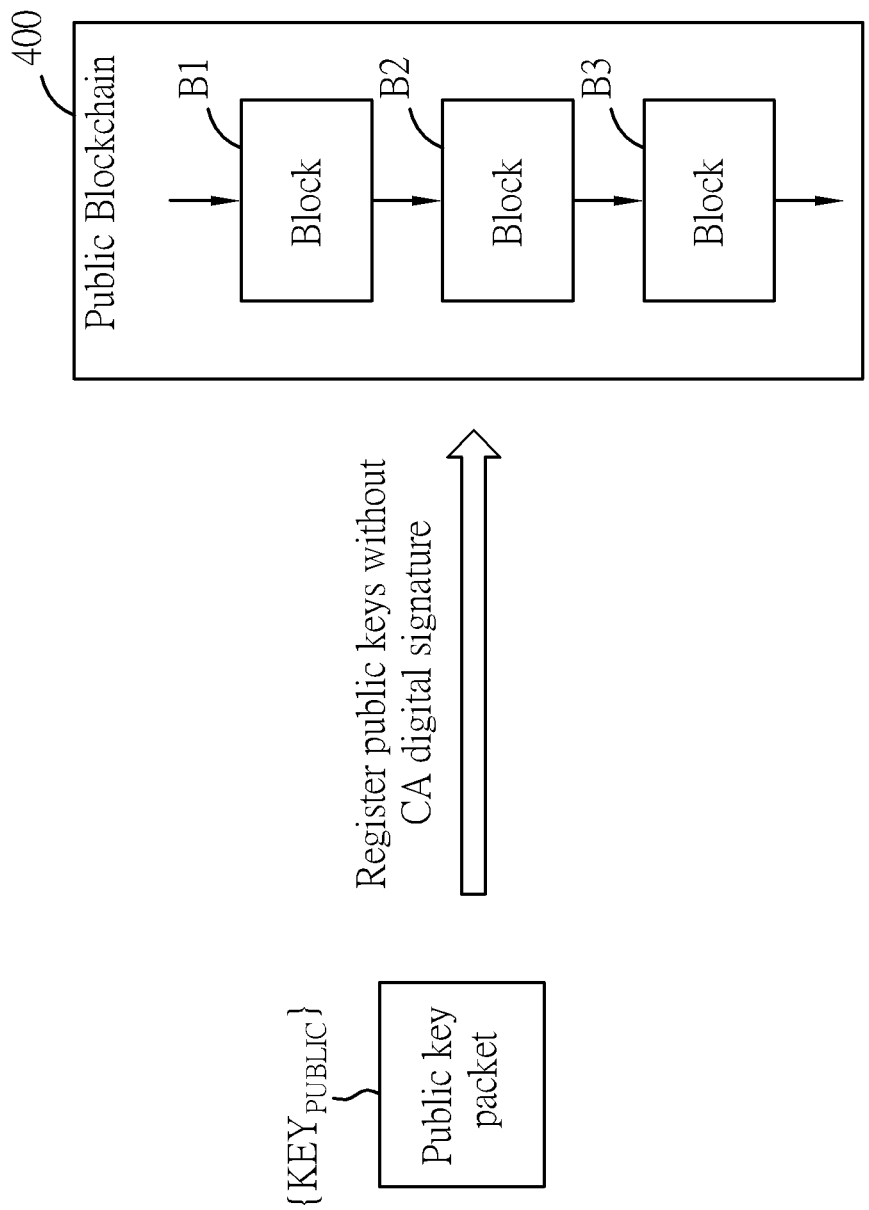
FIG. 4 is a diagram illustrating a public key packet being registered into a public digital database according to an embodiment of the present invention.

FIG. 4 is a diagram illustrating the public key packet $\{KEY_{PUBLIC}\}$ being registered into a digital database such as a public blockchain 400 according to an embodiment of the present invention. In comparison with the embodiment of FIG. 3, everyone is capable of registering the public key packet {KEY$_{PUBLIC}$} into the public blockchain 400, and the public key packet {KEY$_{PUBLIC}$} can be registered to the public blockchain 400 by using user-owned digital signature without an digital signature of the CA (labeled "Register public keys without CA digital signature"), but the present invention is not limited thereto.

Figure 5:
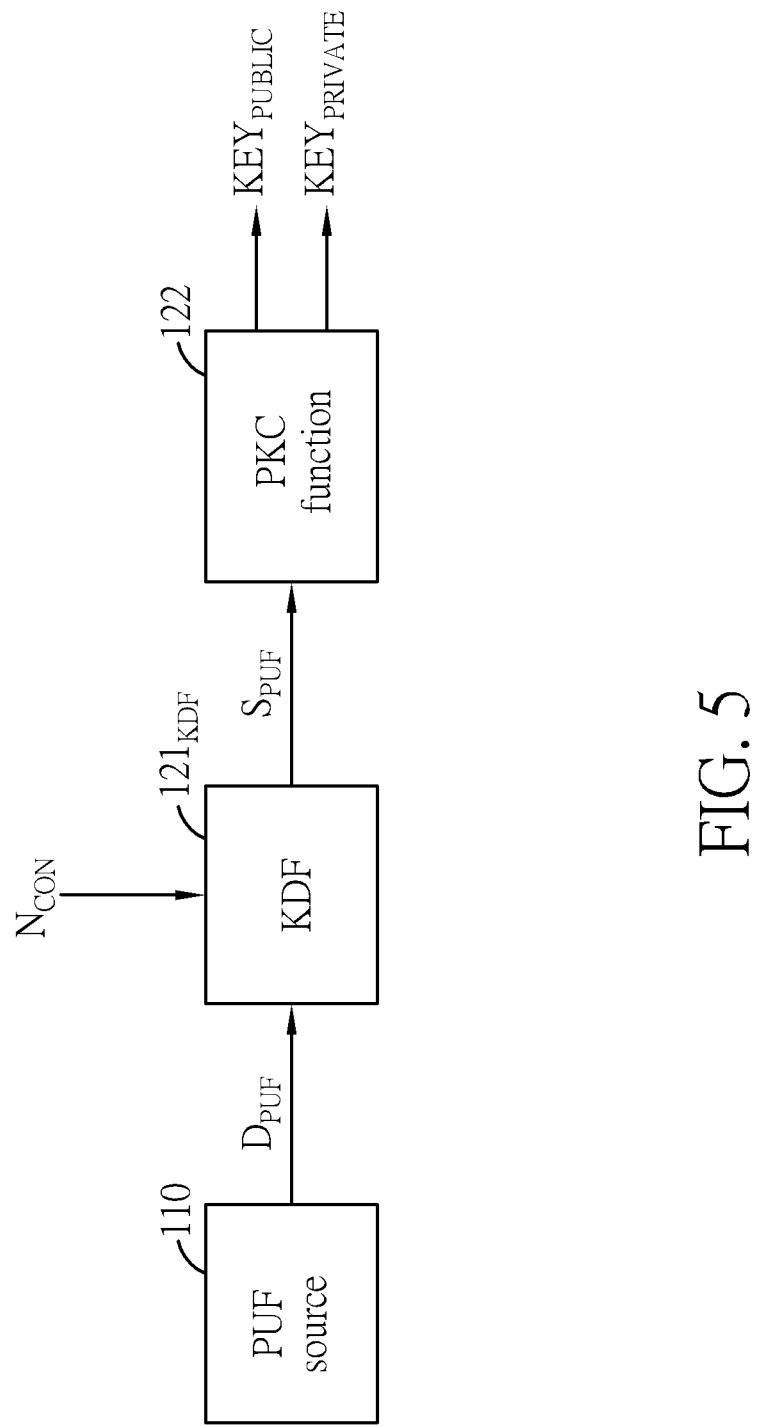
FIG. 5 is a diagram illustrating operations of generating a public key and a private key according to an embodiment of the present invention.

FIG. 5 is a diagram illustrating operations of generating the public key KEY$_{PUBLIC}$ and the private key KEY$_{PRIVATE}$ according to an embodiment of the present invention. As shown in FIG. 5, the PUF source 110 may provide the static entropy data such as PUF data D$_{PUF}$, and the cryptographic circuit 120 may perform a hash function such as a key derivation function (KDF) 121$_{KDF}$ (which may be an example of the hash function 121 shown in FIG. 1) on the PUF data D$_{PUF}$ with a constant number N$_{CON}$ to generate a constant seed S$_{PUF}$, which is not reconfigurable in this embodiment. The cryptographic circuit 120 may further perform the asymmetric cryptography algorithm (e.g., the PKC function 122) according to the constant seed S$_{PUF}$, in order to generate the public key KEY$_{PUBLIC}$ and the private key KEY$_{PRIVATE}$. In this embodiment, as the constant seed S$_{PUF}$ is not reconfigurable, the public key KEY$_{PUBLIC}$ and the private key KEY$_{PRIVATE}$ may be constant and not reconfigurable.

Figure 6:
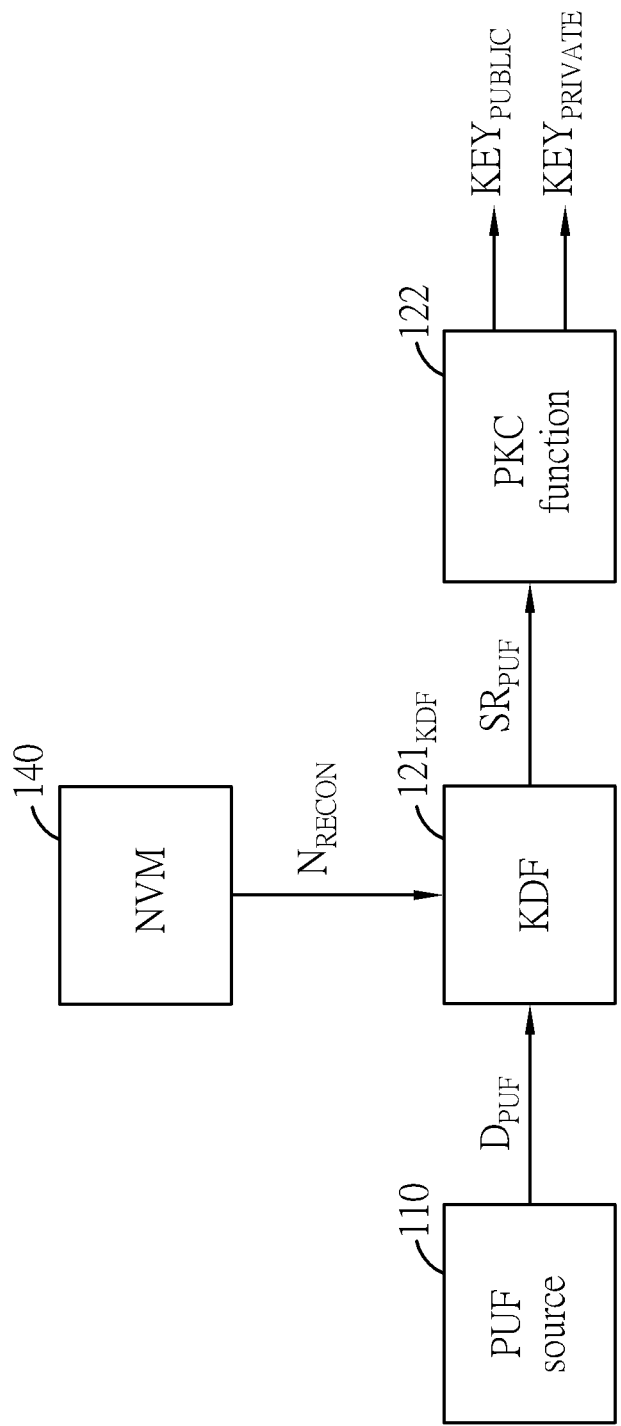
FIG. 6 is a diagram illustrating operations of generating a public key and a private key according to another embodiment of the present invention.

FIG. 6 is a diagram illustrating operations of generating the public key KEY$_{PUBLIC}$ and the private key KEY$_{PRIVATE}$ according to another embodiment of the present invention. In comparison with the embodiment of FIG. 5, the cryptographic circuit 120 may perform the KDF 121$_{KDF}$ on the PUF data D$_{PUF}$ with a reconfigurable random number N$_{RECON}$ (which may be generated with aid of a ring oscillator and stored in the NVM 140 as cryptographic salt) to generate a reconfigurable seed SR$_{PUF}$, which is reconfigurable in this embodiment. Thus, the public key KEY$_{PUBLIC}$ and the private key KEY$_{PRIVATE}$ generated according to the reconfigurable seed SR$_{PUF}$ can be reconfigurable. For example, assuming that the PUF-based control circuit 100 is still workable after being is disassembled from an electronic device, the PUF-based control circuit 100 may control the ring oscillator mentioned above to generate a new random number for reconfiguring the reconfigurable random number N$_{RECON}$, and thereby reconfigure the public key KEY$_{PUBLIC}$ and the private key KEY$_{PRIVATE}$ to make the public key KEY$_{PUBLIC}$ and the private key KEY$_{PRIVATE}$ have new values.

Figure 7:
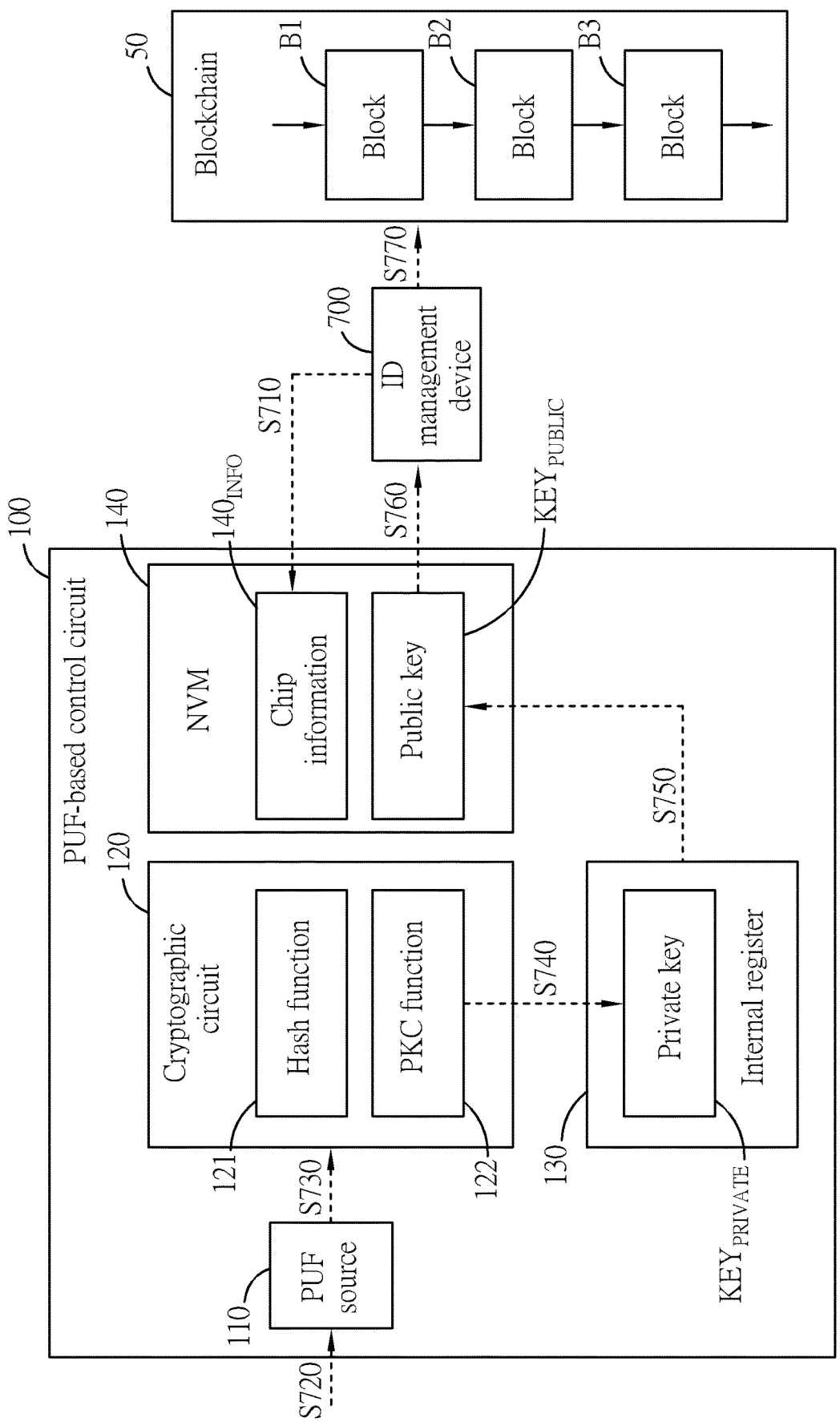
FIG. 7 is a diagram illustrating a working flow of registering a public key into a blockchain according to an embodiment of the present invention.

FIG. 7 is a diagram illustrating a working flow of registering the public key KEY$_{PUBLIC}$ into a blockchain 50 according to an embodiment of the present invention, where the blockchain 50 may be any of a private block chain (e.g., the private blockchain 300 shown in FIG. 3) and a public blockchain (e.g., the public blockchain 400 shown in FIG. 4). In this embodiment, the working flow is executed by the PUF-based control circuit 100 and an ID management device 700, where both of the PUF-based control circuit 100 and an ID management device 700 is from a same manufacturer, but the present invention is not limited thereto. It should be noted that one or more steps may be added, deleted or modified in the working flow shown in FIG. 7, and these steps do not have to be executed in the exact order illustrated in the following description if an overall result is not hindered.

In Step S710, the ID management device 700 may write a serial number and other device information into the PUF-based control circuit 100 (e.g., write into the NVM 140 as the chip information 140$_{INFO}$).

In Step S720, the ID management device 700 may issue a PUF enrollment command or a PUF initialization command to the PUF source, in order to make the PUF source 110 be able to generate static entropy data.

In Step S730, the ID PUF source 110 may feed the static entropy data such as PUF secret value to a cryptographic engine such as the cryptographic circuit 120.

In Step S740, the cryptographic circuit 120 may perform the hash function 121 and the PKC function 122 on the PUF secret value, in order to generate the public key KEY$_{PUBLIC}$ and the private key KEY$_{PRIVATE}$ to the internal register 130 by at least using the PUF secret value. In some embodiment, cryptographic salt may be utilized for generating the public key KEY$_{PUBLIC}$ and the private key KEY$_{PRIVATE}$, but the present invention is not limited thereto.

In Step S750, the PUF-based control circuit 100 may transmit the public key KEY$_{PUBLIC}$ to the NVM 140 from the internal register 130 for being stored in the NVM 140, where the private key KEY$_{PRIVATE}$ is prevented from being transmitted to the NVM 140, and more particularly, is prevented from being transmitted to outside of the electronic device. In some other embodiments, the public key KEY$_{PUBLIC}$ can also be transmitted to the NVM 140 directly.

In Step S760, the ID management device 700 may read the public key KEY$_{PUBLIC}$ from the PUF-based control circuit 100.

In Step S770, the ID management device 700 may generate a digital signature thereof, and register the public key KEY$_{PUBLIC}$ into the blockchain 50. In some embodiment, the chip information 140$_{INFO}$ (e.g., the serial number and/or other information mentioned above) being written into the NVM 140 may be registered into the blockchain 50 in conjunction with the public key KEY$_{PUBLIC}$, but the present invention is not limited thereto.

Figure 8:
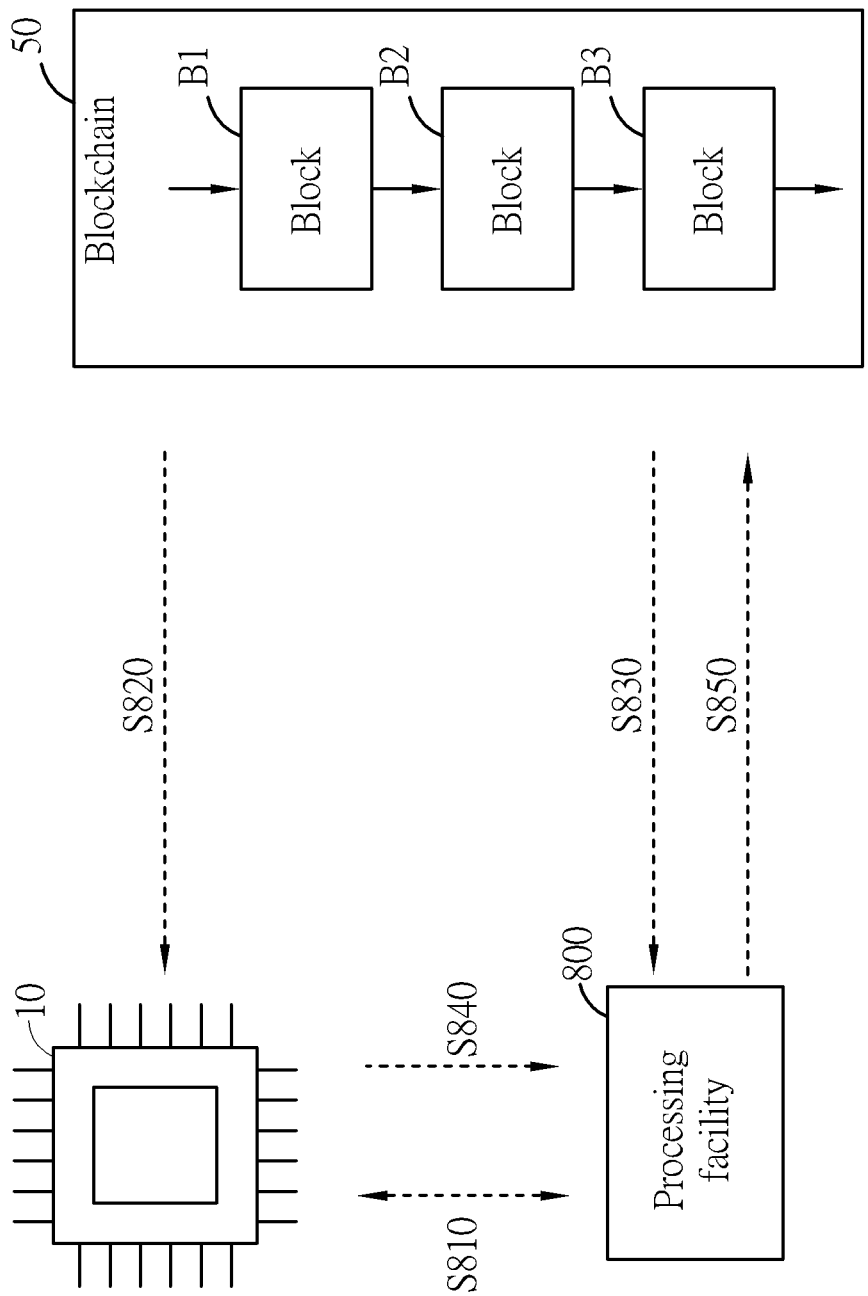
FIG. 8 is a diagram illustrating a working flow of recording processing history of an electronic device into a blockchain according to an embodiment of the present invention.

FIG. 8 is a diagram illustrating a working flow of recording processing history of an electronic device such as a System on a Chip (SoC) 10 into the blockchain 50 according to an embodiment of the present invention, where the SoC 10 may comprise the PUF-based control circuit 100 which is registered in the blockchain as shown in FIG. 7. In this embodiment, the working flow is executed by the SoC 10 (e.g., the PUF-based control circuit 100 therein) and a processing facility 800. It should be noted that one or more steps may be added, deleted or modified in the working flow shown in FIG. 8, and these steps do not have to be executed in the exact order illustrated in the following description if an overall result is not hindered.

In Step S810, when the processing facility 800 performs testing, assembly or disassembly of the SoC 10, the SoC 10 may perform handshaking with the processing facility 800, in order to obtain each other's ID (e.g., public keys). In detail, the SoC 10 (e.g., the PUF-based control circuit 100 therein) may send a public key of the PUF-based control circuit 100 (e.g., the public key KEY$_{PUBLIC}$ shown in FIG. 1) to the processing facility 800, to allow the processing facility 800 to confirm whether the public key of the PUF-based control circuit 100 is registered in the blockchain 50. In addition, the PUF-based control circuit 100 may receive a public key of the processing facility 800 from the processing facility 800, to allow the PUF-based control circuit 100 to confirm whether the public key of the processing facility 800 is registered in the blockchain 50.

In Step S820, the SoC 10 (e.g., the PUF-based control circuit 100 therein) may verify the public key of the processing facility 800 stored in the blockchain 50. For example, the SoC 10 (e.g., the PUF-based control circuit 100 therein) may confirm whether the public key of the processing facility is able to be found in the blockchain 50.

In Step S830, the processing facility 800 may verify the public key of the PUF-based control circuit 100 stored in the blockchain 50. For example, the processing facility 800 may confirm whether the public key of the PUF-based control circuit 100 is able to be found in the blockchain 50.

In Step S840, after it is confirmed that the public key of the processing facility 800 is registered in the blockchain 50, the PUF-based control circuit 100 may confirm that the SoC 10 is handled by an authorized party (e.g., the processing facility 800 which has the public key being registered in the blockchain 50) and sign a processing event (which records a testing event, an assembly event or a disassembly event) by using a private key of the PUF-based control circuit 100 (e.g., the private key $KEY_{PRIVATE}$ shown in FIG. 1). In detail, the PUF-based control circuit 100 may send the digital signature and the processing event of the electronic device to the processing facility 800.

In Step S850, after it is confirmed that the public key of the PUF-based control circuit 100 is registered in the blockchain 50, the processing facility 800 may confirm and sign the processing event by using a private key of the processing facility, and then upload the processing event in conjunction with the digital signature of the PUF-based control circuit 100 and a digital signature of the processing facility 800 to the blockchain 50.

Figure 9:
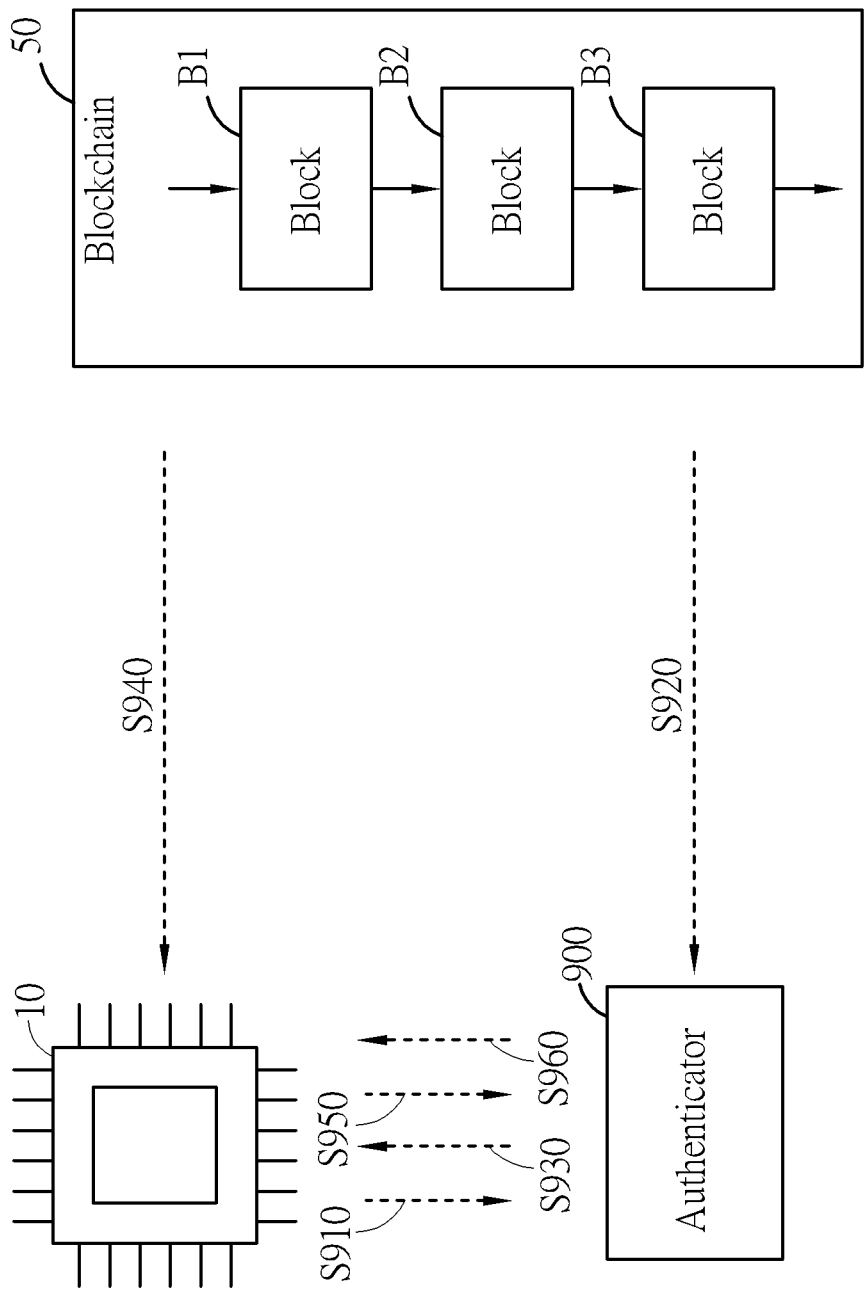
FIG. 9 is a diagram illustrating a working flow of an electronic device performing authentication with an authenticator according to an embodiment of the present invention.

FIG. 9 is a diagram illustrating a working flow of the SoC 10 performing authentication with an authenticator 900 according to an embodiment of the present invention. In this embodiment, the working flow is executed by the SoC 10 (e.g., the PUF-based control circuit 100 therein) and the authenticator 900. It should be noted that one or more steps may be added, deleted or modified in the working flow shown in FIG. 9, and these steps do not have to be executed in the exact order illustrated in the above description if an overall result is not hindered.

In Step S910, the PUF-based control circuit 100 may send an authentication request in conjunction with the public key of the PUF-based control circuit 100 to the authenticator 900.

In Step S920, the authenticator 900 may verify the public key of the PUF-based control circuit 100 stored in the blockchain 50. In particular, the authenticator 900 may confirm whether the public key of the PUF-based control circuit 100 is registered in the blockchain 50.

In Step S930, after it is confirmed that the public key of the PUF-based control circuit 100 is registered in the blockchain 50, the PUF-based control circuit 100 may receive a public key of the authenticator 900 in conjunction with a challenge from the authenticator 900 in response to the authentication request.

In Step S940, the PUF-based control circuit 100 may verify the public key of the authenticator stored in the blockchain 50. In particular, the PUF-based control circuit 100 may confirm whether the public key of the authenticator 900 is registered in the blockchain 50.

In Step S950, the PUF-based control circuit 100 may sign the challenge by using the private key thereof and send the signed challenge in conjunction with a first secret key encrypted by using the public key of the authenticator 900. In particular, the PUF-based control circuit 100 may send the first secret key encrypted by the public key of the authenticator 900 in conjunction with a responding signature to the authenticator, where the responding signature is generated according to the private key of the PUF-based control circuit 100 and the challenge.

In Step S960, the authenticator 900 may verify the responding signature and decrypt the first secret key, and further generates a second secret key encrypted by using the public key of the PUF-based control circuit 100. In particular, after the responding signature is confirmed, the PUF-based control circuit 100 may receive the second secret key encrypted by the public key of the PUF-based control circuit 100 from the authenticator 900.

In Step S970, after key exchange between the PUF-based control circuit 100 and the authenticator 900 is finished, both of the PUF-based control circuit 100 and the authenticator 900 may have the same secret keys such as the first secret key and the second secret key, and the PUF-based control circuit 100 may perform encrypted communications with the authenticator with aid of the first secret key and the second secret key.

Figure 10:
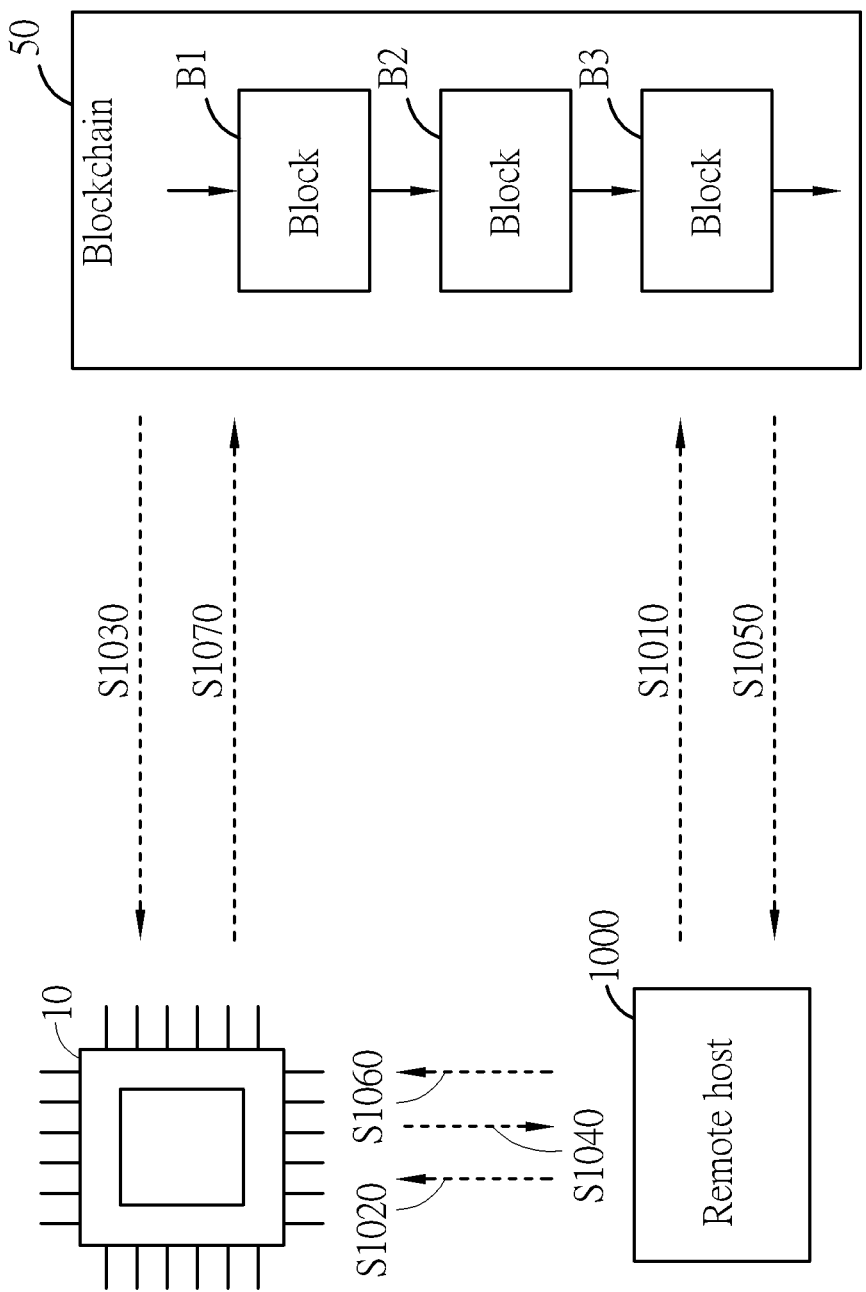
FIG. 10 is a diagram illustrating a working flow of an electronic device performing update in application fields according to an embodiment of the present invention.

FIG. 10 is a diagram illustrating a working flow of the SoC 10 performing update in application fields according to an embodiment of the present invention. In this embodiment, the working flow is executed by the SoC 10 (e.g., the PUF-based control circuit 100 therein) and a remote host 1000 of a service provider (which provides the latest firmware). It should be noted that one or more steps may be added, deleted or modified in the working flow shown in FIG. 10, and these steps do not have to be executed in the exact order illustrated in the above description if an overall result is not hindered.

In Step S1010, the remote host 1000 may register update information into the blockchain 50 (e.g., a latest version number of firmware).

In Step S1020, the remote host 1000 may broadcast an update message to devices.

In Step S1030, when the PUF-based control circuit 100 receives the update message from the remote host 1000, the PUF-based control circuit 100 may check the update information stored in the blockchain 50.

In Step S1040, after it is confirmed that the update information is in the blockchain 50, the PUF-based control circuit 100 may send an update request in conjunction with the public key of the PUF-based control circuit 100 to the remote host 1000. In addition, the PUF-based control circuit 100 may receive a public key of the remote host 1000 from the remote host 1000.

In Step S1050, the remote host 1000 may verify the public key of the PUF-based control circuit 100. In particular, the remote host 1000 may confirm whether the public key of the PUF-based control circuit 100 is registered in the blockchain 50, and the PUF-based control circuit 100 may confirm whether the public key of the remote host 1000 is registered in the blockchain 50.

In Step S1060, after it is confirmed that both of the public keys of the PUF-based control circuit and the remote host 1000 are registered in the blockchain 50, the PUF-based control circuit 100 may perform key exchange with the remote host 1000 in order to transmit or download encrypted firmware. In particular, the remote host 1000 and the PUF-based control circuit may perform key exchange with aid of the public keys of the remote host 1000 and the PUF-based control circuit 100, to allow the remote host 1000 and the PUF-based control circuit 100 to obtain secret keys from each other. As the operation of key exchange between the PUF-based control circuit and the remote host 1000 is similar to that of Step S950 to Step S960 mentioned in the embodiment of FIG. 9, and is not repeated here for brevity.

In Step S1070, the PUF-based control circuit 100 may perform secure update with aid of the secret keys. After the secure update is finished, the PUF-based control circuit 100 may register update history into the blockchain 50. In particular, the PUF-based control circuit 100 may upload an update event (which recording the update history) of the SoC 10 in conjunction with the digital signature of the PUF-based control circuit 100 to the blockchain 50.

Figure 11:
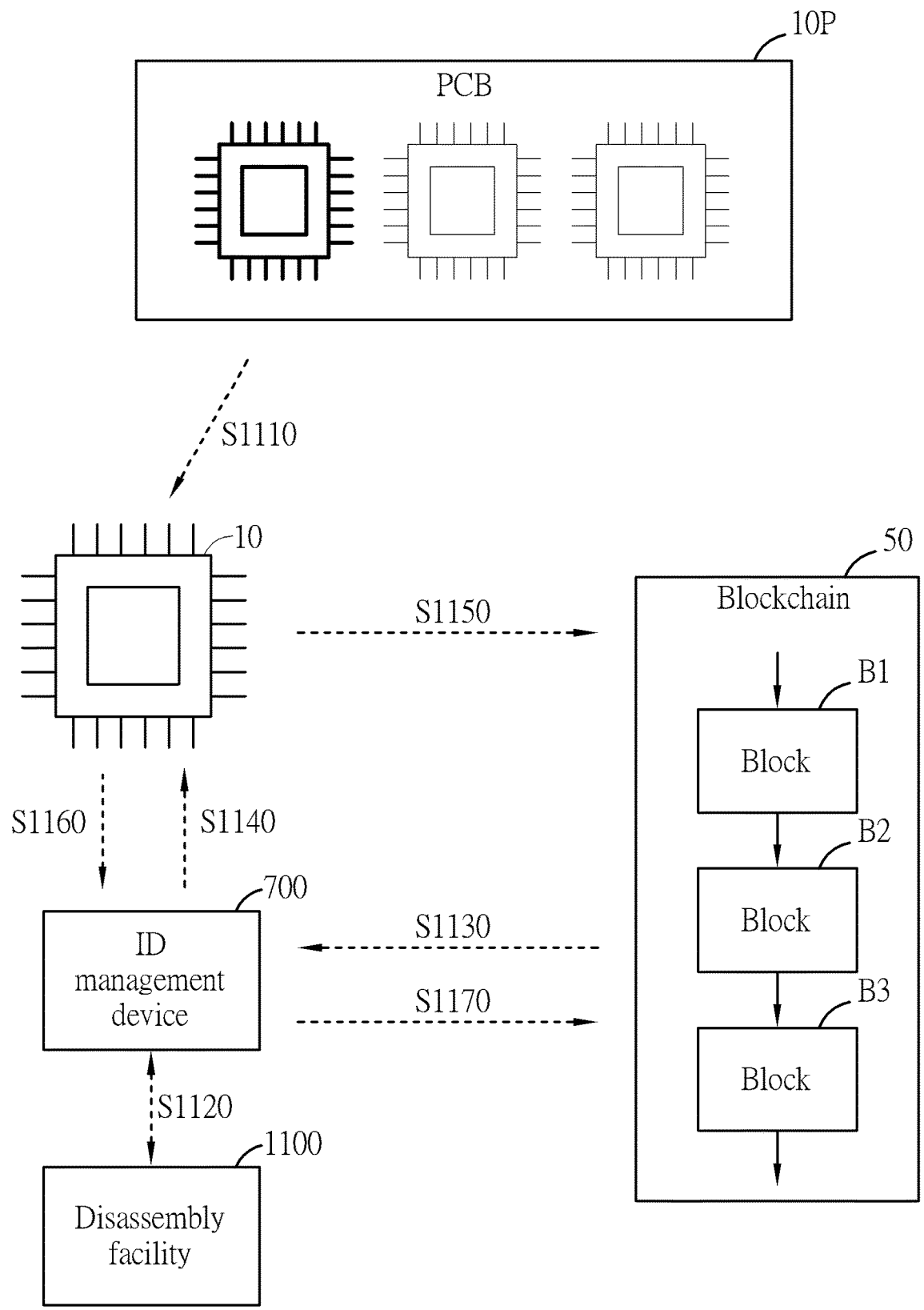
FIG. 11 is a diagram illustrating a working flow of an electronic device performing key revocation after disassembly according to an embodiment of the present invention.

FIG. 11 is a diagram illustrating a working flow of the SoC 10 performing key revocation after disassembly according to an embodiment of the present invention. In this embodiment, the working flow is executed by the SoC 10 (e.g., the PUF-based control circuit 100 therein), the ID management device 700 and a disassembly facility 1100. It should be noted that one or more steps may be added, deleted or modified in the working flow shown in FIG. 11, and these steps do not have to be executed in the exact order illustrated in the above description if an overall result is not hindered.

In Step S1110, a disassembly event of the SoC 10, which is disassembled from a printed circuit board (PCB) 10P, may be registered to the blockchain 50. In particular, after the SoC 10 is disassembled from an apparatus (e.g., the PCB 10P), the PUF-based control circuit 100 may upload the disassembly event of the SoC 10 in conjunction with the digital signature of the PUF-based control circuit 100 to the blockchain 50. The operation of registering the disassembly event of the SoC 10 is similar to the working flow shown in FIG. 8, and is not repeated here for brevity.

In Step S1120, the disassembly facility 1100 may request the ID management device 700 (which registered the public key of the PUF-based control circuit 100 into the blockchain 50 in the embodiment of FIG. 7) to issue a revocation (or recycling) command, where the ID management device 700 and the disassembly facility 1100 may need to verify each other's public keys in the blockchain 50. As the operation of verifying each other's public keys in the blockchain 50 is similar to that of the previous embodiment, and related details are omitted here for brevity.

In Step S1130, the ID management device may verify the disassembly event of the SoC 10 in order to confirm whether the SoC 10 has been processed by the disassembly facility 1100.

In Step S1140, after the ID management device 700 confirms that the disassembly event is in the block chain, the ID management device 700 may send the revocation (or recycling) command to the PUF-based control circuit 100.

In Step S1150, the PUF-based control circuit 100 may receive and verify the revocation (or recycling) command from the ID management device 700. In particular, after the revocation command is verified, the PUF-based control circuit 100 may send a revocation event in conjunction with the digital signature of the PUF-based control circuit 100 to the ID management device 700 in response to the revocation command.

In Step S1160, the PUF-based control circuit 100 may confirm that the current key pair (e.g., the public key and the private key of the PUF-based control circuit 100) is revoked by verifying the digital signature of the PUF-based control circuit 100.

In Step S1170, the ID management device 700 may register a revocation (or recycling) event of the SoC 10 to the blockchain 50. In particular, the ID management device 700 uploads the revocation event in conjunction with the digital signature of the PUF-based control circuit 100 and a digital signature of the ID management device 700.

To summarize, the method and the control circuit (e.g., the PUF-based control circuit 100) provided by the embodiments of the present invention can take the public key (which is generated according to the static entropy data) as an unique ID of an electronic device, and this unique ID can be registered in the blockchain which is hard to be tampered.

In addition, as any activity of the electronic device comprising the control chip can be recorded in the blockchain in conjunction with an unique digital signature (which is generated according to the private key), the relationship between the uploaded message (which record activity events of the electronic device) and the public key can be effectively verified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing information of an electronic device including a control circuit, comprising:
   utilizing a static entropy source to provide static entropy data;
   utilizing a cryptographic circuit to generate a public key and a private key according to the static entropy data, wherein the public key is to be registered into a blockchain by an identifier (ID) management device;
   utilizing the cryptographic circuit to generate the public key and the private key to an internal register, wherein the internal register is unreadable for outside of the electronic device;
   transmitting the public key to a non-volatile memory (NVM) from the internal register, wherein the private key is prevented from being transmitted to the NVM; and
   utilizing a signature generating circuit to generate a digital signature at least according to the private key, wherein the information of the electronic device is to be uploaded to the blockchain in conjunction with the digital signature.

2. The method of claim 1, wherein utilizing the signature generating circuit to generate the digital signature at least according to the private key comprises:
   utilizing the signature generating circuit to generate the digital signature according to the private key and the information of the electronic device.

3. The method of claim 1, wherein verification of a relationship between the information of the electronic device and the public key registered in the blockchain is performed according to the digital signature.

4. The method of claim 1, wherein utilizing the cryptographic circuit of the control circuit to generate the public key and the private key according to the static entropy data comprises:
   utilizing the cryptographic circuit to perform an asymmetric cryptography algorithm according to the static entropy data, in order to generate the public key and the private key.

5. The method of claim 4, wherein utilizing the cryptographic circuit of the control circuit to generate the public key and the private key according to the static entropy data further comprises:
   utilizing the cryptographic circuit to performs a hash function on the static entropy data with a reconfigurable random number to generate a seed;
   utilizing the cryptographic circuit to performs the asymmetric cryptography algorithm according to the seed, in order to generate the public key and the private key.

6. The method of claim 1, further comprising:
   when a processing facility performs testing, assembly or disassembly of the electronic device, sending the public key of the control circuit to the processing facility from the control circuit, to allow the processing facility to confirm whether the public key of the control circuit is registered in the blockchain, and receiving a public key of the processing facility from the processing facility to allow the control circuit to confirm whether the public key of the processing facility is registered in the blockchain.

7. The method of claim 6, further comprising:
after it is confirmed that any of the public keys of the control circuit and the processing facility is registered in the blockchain, sending the digital signature and a processing event of the electronic device to the processing facility from the control circuit, to allow the processing facility to upload the processing event in conjunction with the digital signature to the blockchain.

8. The method of claim 1, further comprising:
sending an authentication request in conjunction with the public key of the control circuit to an authenticator from the control circuit, to allow the authenticator to confirm whether the public key of the control circuit is registered in the blockchain; and
after the public key of the control circuit is confirmed, receiving a public key of the authenticator in conjunction with a challenge from the authenticator in response to the authentication request.

9. The method of claim 8, further comprising:
after receiving the public key of the authenticator, sending a first secret key encrypted by the public key of the authenticator in conjunction with a response to the authenticator from the control circuit, wherein the response is generated according to the private key of the control circuit and the challenge;
after the response is confirmed, receiving a second secret key encrypted by the public key of the control circuit from the authenticator; and
performing encrypted communications between the electronic device and the authenticator with aid of the first secret key and the second secret key.

10. The method of claim 1, further comprising:
after the electronic device is disassembled from an apparatus, utilizing the control circuit to upload a disassembly event of the electronic device in conjunction with the digital signature to the blockchain;
after the ID management device confirms that the disassembly event is in the block chain, receiving a revocation command from the ID management device;
sending a revocation event in conjunction with the digital signature to the ID management device from the control circuit in response to the revocation command; and
utilizing the ID management device to upload the revocation event in conjunction with the digital signature to the blockchain.

11. A method for managing information of an electronic device including a control circuit, comprising:
utilizing a static entropy source to provide static entropy data;
utilizing a cryptographic circuit to generate a public key and a private key according to the static entropy data, wherein the public key is to be registered into a blockchain by an identifier (ID) management device; and wherein the private key is stored in an internal register that is unreadable for outside of the electronic device;
utilizing a signature generating circuit to generate a digital signature at least according to the private key, wherein the information of the electronic device is to be uploaded to the blockchain in conjunction with the digital signature;
receiving a public key of a remote host from the remote host, to allow the control circuit to confirm whether the public key of the remote host is registered in the blockchain; and
sending the public key of the control circuit to the remote host from the control circuit, to allow the remote host to confirm whether the public key of the control circuit is registered in the blockchain.

12. The method of claim 11, further comprising:
after the public keys of the control circuit and the remote device are confirmed, performing key exchange with aid of the public keys of the remote host and the control circuit, to allow the remote host and the control circuit to obtain secret keys from each other, for performing secure update with aid of the secret keys; and
after the secure update is finished, utilizing the control circuit to upload an update event of the electronic device in conjunction with the digital signature to the blockchain.

13. An control circuit for managing information of an electronic device, the electronic device comprising the control circuit, the control circuit comprising:
a static entropy source, configured to provide static entropy data;
a cryptographic circuit, configured to generate a public key and a private key according to the static entropy data;
a signature generating circuit, configured to generate a digital signature at least according to the private key;
an internal register, configured to store the private key, wherein the internal register is unreadable for outside of the electronic device; and
a non-volatile memory (NVM), configured to store the public key;
wherein the cryptographic circuit generates the public key and the private key to the internal register, the public key is further transmitted to the NVM from the internal register, and the private key is prevented from being transmitted to the NVM, the public key of the control circuit is to be registered into a blockchain by an identifier (ID) management device, and the information of the electronic device is uploaded to the blockchain in conjunction with the digital signature.

14. The control circuit of claim 13, wherein the signature generating circuit generates the digital signature according to the private key and the information of the electronic device.

15. The control circuit of claim 13, wherein verification of a relationship between the information of the electronic device and the public key registered in the blockchain is performed according to the digital signature.

16. The control circuit of claim 13, wherein the cryptographic circuit performs an asymmetric cryptography algorithm according to the static entropy data, in order to generate the public key and the private key.

17. The control circuit of claim 16, wherein the cryptographic circuit performs a hash function on the static entropy data with a reconfigurable random number to generate a seed, and the cryptographic circuit performs the asymmetric cryptography algorithm according to the seed, in order to generate the public key and the private key.

18. The control circuit of claim 13, wherein:
when a processing facility performs testing, assembly or disassembly of the electronic device, the control circuit sends the public key of the control circuit to the processing facility to allow the processing facility to confirm whether the public key of the control circuit is registered in the blockchain, and receives a public key of the processing facility from the processing facility to allow the control circuit to confirm whether the public key of the processing facility is registered in the block chain;

after it is confirmed that any of the public keys of the control circuit and the processing facility is registered in the blockchain, the control circuit sends the digital signature and a processing event of the electronic device to the processing facility, to allow the processing facility to upload the processing event in conjunction with the digital signature to the blockchain.

* * * * *